United States Patent
Derderian et al.

[15] 3,675,012
[45] July 4, 1972

[54] CINEFLUOROGRAPHIC HOLOGRAPHY

[72] Inventors: George Derderian, Maitland, Fla.; Joseph L. De Clerk, Red Bank, N.J.

[73] Assignee: The United States of America as represented by the Secretary of the Navy

[22] Filed: Oct. 15, 1970

[21] Appl. No.: 80,877

[52] U.S. Cl..................................250/60, 350/3.5
[51] Int. Cl...............................G01n 23/04, G02b 27/22
[58] Field of Search..................350/3.5; 250/60, 66; 95/18; 352/57

[56] References Cited

OTHER PUBLICATIONS

Redman et al., 220 Nature 58–60 (10/1968)

McCrickerd et al., 12 Applied Physics Letters 10–12 (Y 1968)

Primary Examiner—David Schonberg
Assistant Examiner—Robert L. Sherman
Attorney—Richard S. Sciascia, John W. Pease and John F. Miller

[57] ABSTRACT

Two motion picture cameras are arranged to photograph the fluoroscopic image derived from two respective X-ray or other energy beams which pass through a subject at respectively different angles. The motion picture films are developed and used in sterposcopic pairs to make holograms on a third motion picture film. The information on the third film provides a three dimensional motion picture holographic image of the subject.

1 Claim, 5 Drawing Figures

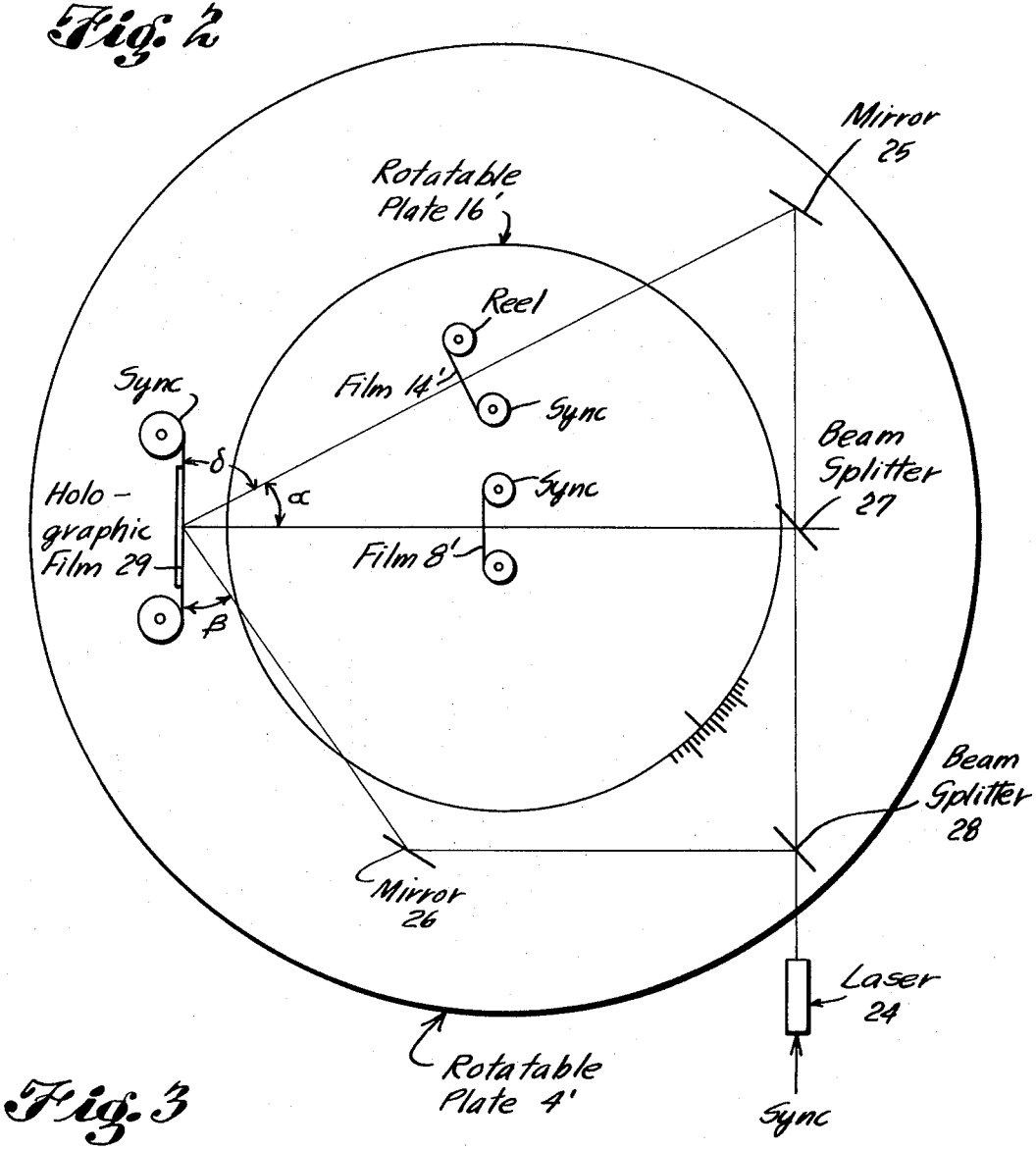
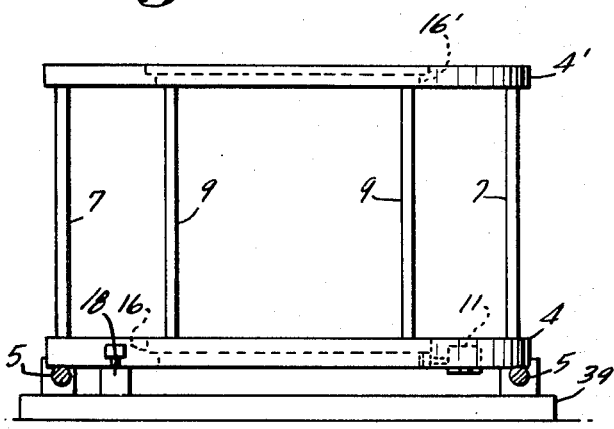

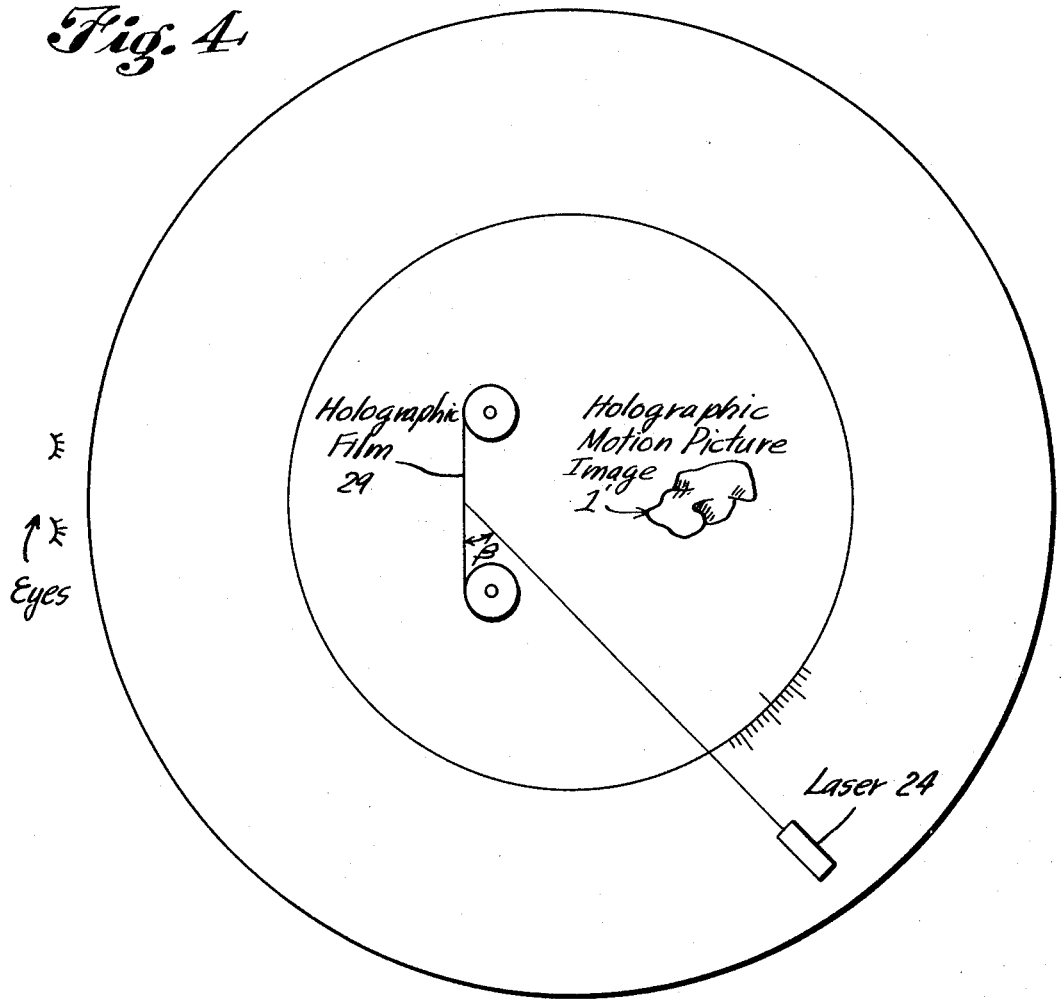

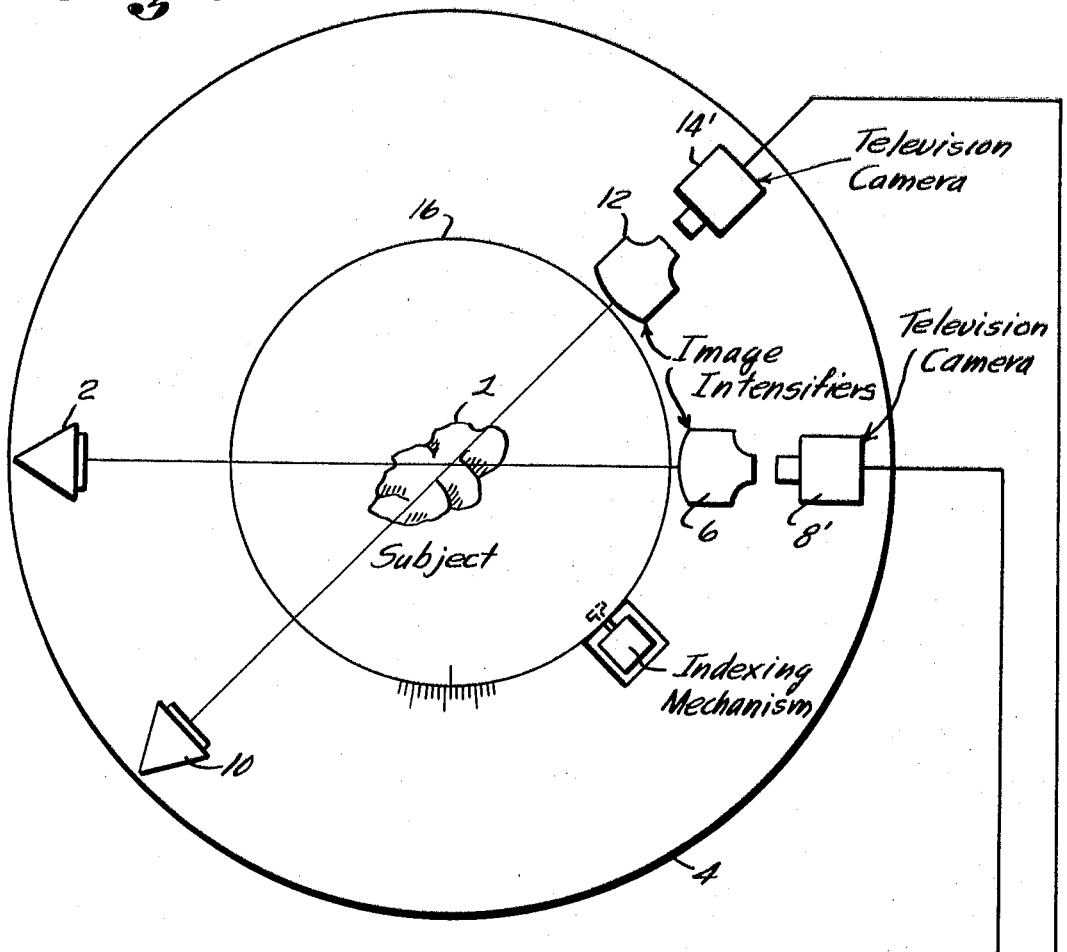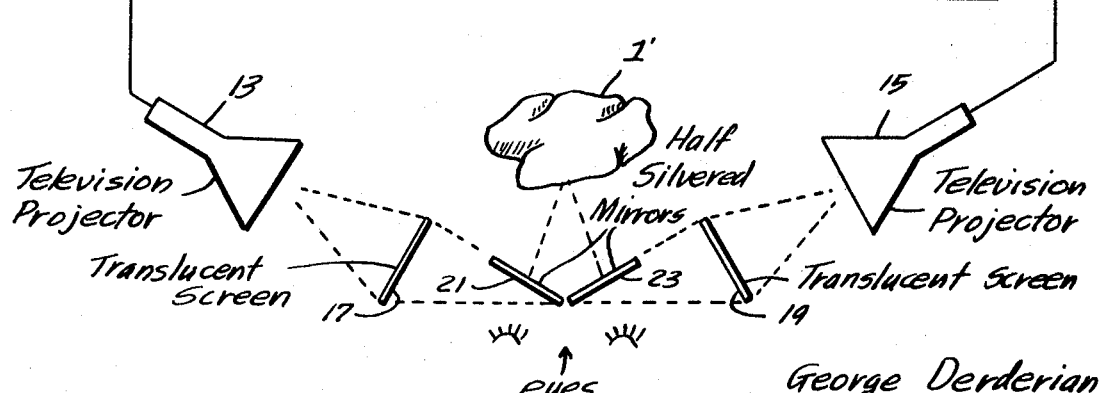

CINEFLUOROGRAPHIC HOLOGRAPHY

STATEMENT OF GOVERNMENT INTEREST

The invention described herein may be manufactured and used by or for the Government of the Unites States of America for governmental purposes without the payment of any royalties thereon or therefor.

BACKGROUND OF THE INVENTION

The invention is in the fields of holography and radiography. In the prior art, various efforts have been made to obtain more useful X-ray or other radiographic views of various subjects which would provide more information than ordinary radiographic films and permit a prolonged and intensive study without the danger of damage to the subject. The invention solves these problems of the prior art by utilizing known apparatus and techniques in a novel combination of apparatus and methods.

SUMMARY OF THE INVENTION

Cooperating pairs of X-ray or other energy generators and motion picture cameras are arranged to photograph stereoscopic pairs of shadow images of a subject. A succession of stereoscopic pairs is made. A succession of pictures of successive slices of the subject through different planes can be made. The motion picture films are developed and used to make holograms on a third motion picture film. Means are provided for projecting motion picture three dimensional images of the subject at selected planes taken through the subject. An embodiment utilizing television apparatus is disclosed.

BRIEF DESCRIPTION OF THE DRAWINGS

FIG. 2 shows apparatus for making a hologram from motion picture films.

FIG. 3 shows apparatus for maintaining the correct beam angle in the motion picture and hologram making processes.

FIG. 4 shows apparatus for reproducing a holographic image.

FIG. 5 shows a modification of the invention.

DESCRIPTION OF THE PREFERRED EMBODIMENT

Figure 1:
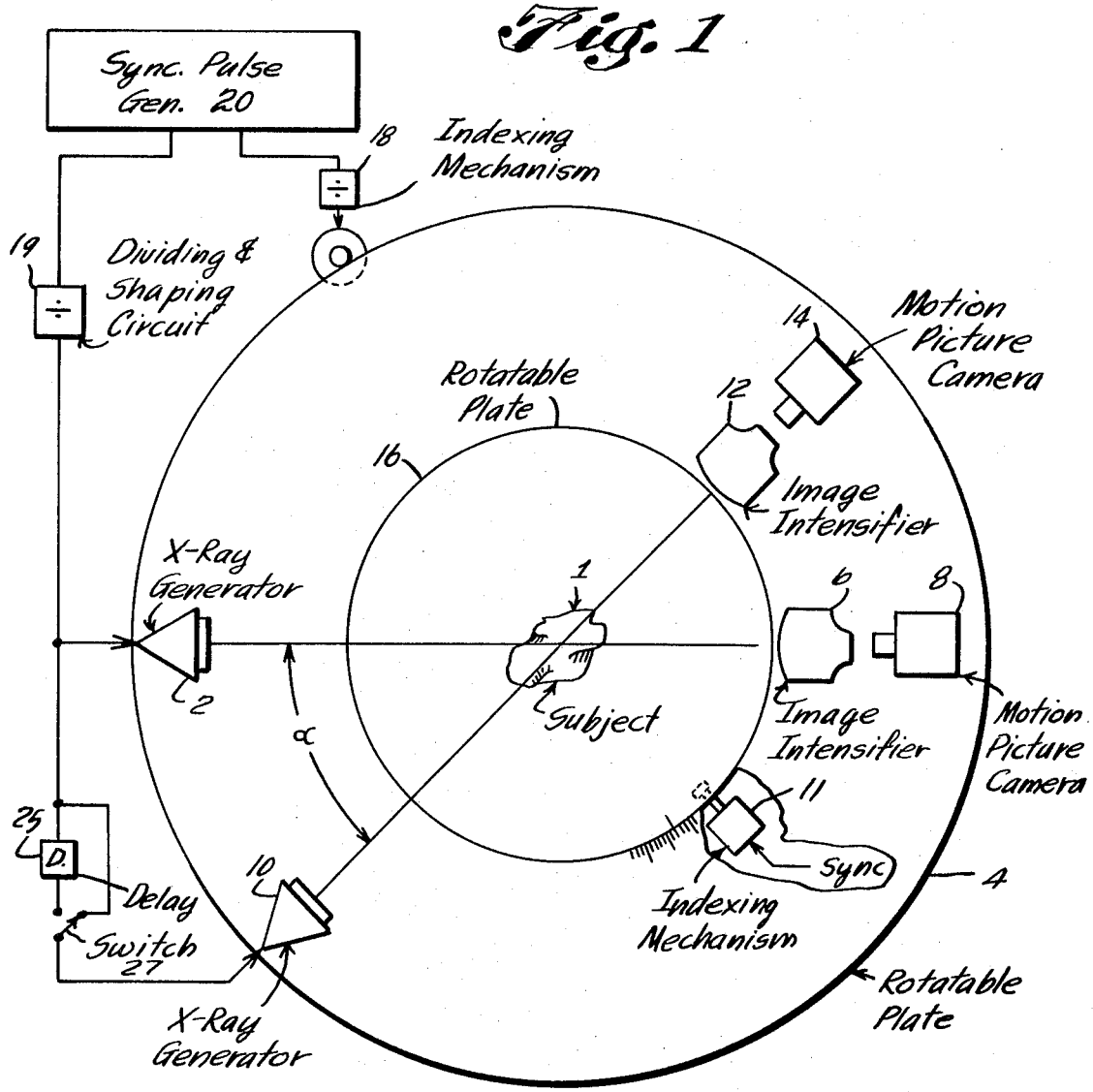
FIG. 1 shows apparatus for making motion pictures of fluoroscopic images.

FIG. 1 shows apparatus for making X-ray motion picture films of a subject. An X-ray generator 2 is mounted on a rotatable plate 4 in a position to direct an X-ray beam through a subject 1 to an image intensifier 6. The image developed by image intensifier 6 is photographed by a motion picture camera 8. A second X-ray generator 10 is mounted in a position to send a second X-ray beam through subject 1 to a second image intensifier 12 and motion picture camera 14. The X-ray beams are positioned at an angle $\alpha$ from each other to provide stereoscopic pairs of images. The cameras and image intensifiers are mounted on plate 4. Subject 1 is mounted on an inner rotatable plate 16. Plates 4 and 16 rotate on bearings not shown. An index mark on 16 cooperates with a scale on 4 so that one or both of the plates can be rotated an exact amount with respect to each other. A drive motor 18 is arranged to drive plate 4 through gears not shown to accomplish a desired rotation. A similar motor and gear arrangement may be used to drive plate 16. A synchronizing pulse generator 20 is connected to synchronize the X-ray generators, cameras, and drive motor or motors to synchronize these components in a known manner.

In operation the X-ray generators may beam short pulses of X-rays through subject 1. These pulses are synchronized with the cameras. The persistence of the screens in the image intensifiers may be such that a very short pulse of X-ray energy through the subject results in a picture which persists on the image intensifier screen long enough for a relatively lengthy exposure of one or more frames of motion picture films. This enables the use of relatively slow high resolution films and/or makes it possible to make several original frames of film of the subject from one X-ray exposure. These frames can be combined into a useable motion picture film without resorting to the filming of films and the resulting loss of resolution to obtain a lengthy run. It is important when X-raying live subjects and other subjects susceptible to X-ray damage to minimize the amount of X-ray exposure. The invention is described for convenience as using X-ray energy. Any other form of radiographic energy, e.g., gamma rays, may be used in applying the principles of the invention.

FIG. 2 shows apparatus for making a motion picture hologram from the developed film. These films, 8' and 14', are mounted on reels in known motion picture making apparatus which is mounted on a rotatable plate 16'. A beam of coherent light from a laser 24 is directed to a beam splitter 27 and a mirror 25 which reflect respective beams through films 8' and 14' to a holographic film 29. A third beam derived from laser 24, a beam splitter 28, and a mirror 26, strikes film 29 at a reference angle $\beta$. The film 29 is mounted in known motion picture apparatus fixed to a rotatable plate 4'. The films 8', 14', and 29 are moved in synchronism with the pulsing of laser 24 to convert film 29 into a hologram in a known manner. Plates 4' and 16' are sequentially indexed with respect to each other by means not shown in the manner of plates 4 and 16 of FIG. 1. Plates 4' and 16' may be fixed to plates 4 and 16 as by supports 7 and 9 shown in FIG. 3. The apparatus may be supported in a bearing 5 on a base 39 and both sets of plates may be indexed by the same indexing means 11 and/or 18 to insure that the same beam angles are maintained in the motion picture and hologram making processes.

FIG. 3 shows a cross sectional view of a suitable arrangement for mounting plates 4, 16, 4' and 16'. A circular base 39 supports a bearing 5 on which plate 4 rotates. Plate 16 is flanged as shown and supported within plate 4. Plate 4' is supported on posts 7 affixed to plate 4. Plate 16' is supported within plate 4'. Posts 9 connect 16 and 16'. A separate drive motor 18 fixed to plate 4 drives 16 through suitable gearing when desired to move 16 with respect to 4. The views of the elements of FIG. 3 are cross sections taken at planes suitable for illustrating the principles of the apparatus. It is necessary that the angles $\alpha$, $\beta$, and $\gamma$ shown in FIGS. 1 and 2 be maintained to construct a good hologram.

FIG. 4 shows the method of viewing holographic film 29 after it has been developed. The developed film is illuminated by light from laser 24 at the reference angle $\beta$. An observer's eyes are positioned at such distance that the stereoscopic pair of images recorded in the holographic film are visible as a three dimensional holographic image. Since film 29 is run through motion picture apparatus, the observer sees a motion picture three dimensional X-ray. This is extremely useful for viewing moving organs, e.g., a heart beat, or the internals of moving machinery.

X-ray generators 2 and 10 in FIG. 1 are activated by a signal from sync pulse generator 20 to generate pulses of X-rays which penetrate subject 1 and impinge on image intensifiers 6 and 12. Motion picture cameras 8 and 14 are simultaneously activated to photograph the image outputs from the image intensifiers to photographically record X-ray images of subject 1. Since the X-ray beams from generators 2 and 10 are separated by a selected angle $\alpha$, the photographs recorded in cameras 8 and 14 comprise a stereoscopic pair. All connecting lines from sync pulse generator 20 to the elements of FIG. 1 are not shown, however it should be understood that all the elements of the apparatus are synchronized by pulses from 20 in a manner well known in the art. Known pulse responsive activating means may be used to operate the various elements. When a simultaneous operation of X-ray generators 2 and 10 is not desired a switch 27 may be operated to place a delay circuit 25 in the synchronizing input line to X-ray generator 10. A similar switch and delay (not shown) is provided in the synchronizing pulse input line to camera 14 and is operated with switch 27.

A dividing and shaping circuit 19 is inserted in the sync pulse line from sync pulse generator 20 to the X-ray generators 2 and 10. Depending on the characteristics of the X-ray generators, the image intensifiers, cameras, and the subject, the exposure of the subject to radiation may be lessened by reducing the number and duration of the X-ray pulses. After one or more pictures are made of subject 1 in the position shown in FIG. 1, indexing mechanism 11 or 18 may be operated to rotate plate 16 or plate 4 with respect to the other to present a new aspect of subject 1 to the X-ray generators and cameras so that another stereoscopic pair of pictures can be made. This is repeated until a desired number of stereoscopic pairs are completed. The film from cameras 8 and 14 is then developed and used in the apparatus of FIG. 2 to make a motion picture hologram.

FIG. 5 shows apparatus for displaying a three dimensional X-ray image of subject 1 in real time. The apparatus is similar to that of FIG. 1 except that motion picture cameras 8 and 14 are replaced by two television cameras 8' and 14'. The video outputs of these television cameras are connected by suitable means, e.g., slip rings, and the lines shown, to two respective television projectors 13 and 15. Projectors 13 and 15 project a stereoscopic pair of images of subject 1 onto two translucent screens 17 and 19. An observer views the images on screens 17 and 19 through two half silvered mirrors 21 and 23 which are positioned as shown. A virtual image 1' of subject 1 is seen in space by an observer who has his eyes positioned as shown with respect to mirrors 21 and 23. Plate 16 may be indexed or continuously rotated to present successively different aspects of subject 1 to the cameras.

It is possible to record a plurality of stereoscopic pairs of images in the form of interference patterns in the holographic film by rotating the film to a different angle for each successive pair, using the apparatus of FIG. 2.

These pairs can be read out successively using the apparatus of FIG. 4 by rotating the plate 16 a like amount. This enables the observer to see successively different aspects of image 1'. The effect is that of rotating subject 1 to obtain different views.

It is obvious that persons skilled in the art can make single pairs of pictures using ordinary rather than motion picture cameras in applicant's invention.

What is claimed is:

1. In a radiographic system, the improvement comprising:
 a first generator for projecting a beam of radiographic energy through a subject,
 a second generator for projecting a second beam of radiographic energy at a prescribed angle from said first beam through said subject,
 a first camera means and a second camera means positioned to intercept said first and second beams respectively and to produce a stereoscopic pair of images of said subject,
 projecting means for combining said stereoscopic pair of images into a single dynamic three dimensional radiographic image of said subject to enable observation of the functions of internal organs or elements of said subject in a selected time scale,
 a first and a second image intensifier means positioned before said first and second respective camera means to intercept said beams and present intensified images of said subject to said camera means,
 rotatable mounting means for mounting said generators, said camera means, said image intensifier means, and said subject, whereby said subject may be moved prescribed amounts with respect to said generators, camera means, and image intensifier means to present different aspects of said subject to said cameras,
 said projecting means comprising hologram means for combining said stereoscopic pair of images into an interference pattern to form a hologram, and readout means for deriving a dynamic three dimensional radiographic image from said hologram,
 said camera means comprising a pair of motion picture cameras, said hologram means comprising means for forming a sequence of holograms on a sequence of frames of motion picture film,
 said readout means comprising means for deriving a dynamic three dimensional radiographic motion picture image of said subject from said sequence of holograms,
 said hologram means including laser means for providing coherent light beams for forming said holograms and for deriving said three dimensional radiographic motion picture image,
 said rotatable mounting means comprising a first rotatable platform, means for mounting said subject on said platform, a first rotatable ring surrounding said platform and concentric therewith, means for mounting said generators, said image intensifier means, and said camera means on said first rotatable ring, a second rotatable platform fixed to said first platform and rotatable therewith, a second rotatable ring surrounding said second rotatable platform and concentric therewith, said second rotatable ring being fixed to said first rotatable ring and rotatable therewith, said hologram means comprising motion picture holographic means for combining information on a pair of films from said first and second motion picture cameras into a holographic interference pattern on a third motion picture film, said pair of films being mounted on said second rotatable platform, said third film and said laser means being mounted on said second rotatable ring.

* * * * *